Patented Jan. 19, 1954

2,666,701

UNITED STATES PATENT OFFICE 2,666,701

OPTICAL SENSITIZATION OF PHOTOMECHANICAL RESISTS

William West, Rochester, N. Y., assignor to Eastman Kodak Company, Rochester, N. Y., a corporation of New Jersey No Drawing. Application October 15, 1952, Serial No. 314,973

20 Claims. (Cl. 95—7)

This invention relates to the optical sensitization of photomechanical resists.

It is well known that certain unsaturated organic keto compounds when exposed to light harden, so that if a film of such unsaturated keto compounds (usually dispersed in a resinous carrier or vehicle) is exposed to a light pattern such as that cast by an ordinary photographic silver negative, a hardened positive is produced. Upon removal of the unhardened keto compound and the carrier, a positive relief image of value in printing processes is obtained.

The light which effects the hardening (resinification) of the unsaturated keto compound is of short wavelength, i. e., blue and ultra-violet light. I have now found that certain dyes will optically sensitize the unsaturated keto compounds so that upon exposure to white light not only the short wavelength light but also the longer wavelength light act on the keto compound to harden (i. e. resinify or insolubilize) it. One result of thus sensitizing the keto compounds is that the additional light absorbed from a white source of light, or any source containing light in the extended region, accelerates the insolubilization of the composition.

In so far as the mechanism by which the sensitizing effect is produced, can be ascertained, in the broadest sense the action of the dye appears to constitute a photo-chemical sensitization, the essential reaction, the polymerization of the ketone, requiring an amount of energy less than that in the quantum of light absorbed by the system itself. The dyes absorb at longer wavelengths than the ketone itself, and accordingly, it appears from the effects obtained that the dyes may transfer their absorbed energy to the reactive system and bring about the reaction. Certain other considerations suggest that an oxidative step may be involved.

The object of my invention is to provide optically sensitized systems suitable for use in photomechanical reproduction processes. Another object is to provide the reactive ketone compounds, and dyes capable of functioning as optical sensitizers for the ketone compounds and thereby effecting in the presence of light a differential insolubilization of a system containing the ketone compound and dye. Another object is to provide methods for utilizing the sensitized systems in the production of resist images for printing plates. Other objects will become apparent from a consideration of the following description of my invention.

Typical compounds which will serve to exemplify the ketone compounds useful in my invention are the following:

Furfural acetone
m-Nitrobenzal furfural acetone
Dicinnamal acetone
Anisal cinnamal acetone
Di-p-tolual acetone
Dipiperonal acetone
Dianisal acetone
Benzal acetone
Difurfural acetone
Cinnamal acetone
Piperonal acetone
Piperonal acetophenone
Furfural acetophenone
Cinnamal acetophenone
Dicinnamal cyclohexanone
Dicinnamal p-methyl cyclohexanone
Dicinnamal cyclopentanone
Difurfural cyclopentanone
Difurfural cyclohexanone
Dianisal cyclohexanone The above keto compounds fall under one of the following general formulas

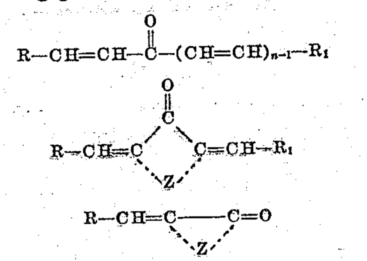

wherein R and $R_1$ represents either an aralkyl, aryl or furyl group, $n$ is either 1 or 2, and Z represents the non-metallic atoms necessary to complete a carbocyclic ring. Compounds thus classifiable and made from cyclic ketones are particularly useful, e. g., difurfural cyclopentanone and dicinnamal cyclohexanones, although valuable results can be obtained with the other ketone compounds.

The cyanine dyes derived from simple thiazoles, benzothiazoles, benzoselenazoles and naphthathiazoles give useful results when employed as spectral sensitizing agents for the ketones as shown by the following examples:

Thiacarbocyanines:
- 3,3′-diethyl - 6,6′ - dinitrothiacarbocyanine chloride
- 3,3′-diethyl - 6,6′ - dinitrothiacarbocyanine p-toluene sulfonate 3,3′-diethylthiacarbocyanine paratoluene sulfonate
3,3′-diethyl-9-methylthiacarbocyanine bromide
3,3′-diethyl-4,5,4′,5′-dibenzothiacarbocyanine ethyl sulfate Thiazolocarbocyanine: 3,3′-diethyl-4,4′-diphenylthiazolocarbocyanine iodide
Selenacarbocyanine: 3,3′-diethyl-9-methylselenacarbocyanine bromide
Azacarbocyanines: 3,3′-diethyl-8,9-diazathiacarbocyanine iodide The above dyes can, in general, be prepared by methods well known in the art, i. e., by heating the appropriate quaternary salt with the appropriate orthoester in anhydrous pyridine solution. Specific references are Brooker and White, J. A. C. S. 57, 2480 (1935); Brooker et al., J. A. C. S. 64, 208 (1942); Brooker, U. S. Patents 1,969,444, August 7, 1934, and 1,994,563, March 19, 1935; and White, U. S. Patent 1,990,681, February 12, 1935. The preferred dyes contain alkyl groups of from 1 to 4 carbon atoms, e. g., methyl, ethyl, n-propyl, n-butyl, isobutyl, etc. The dyes are preferably used in the form of the quaternary salt.

A feature to be noted residing in the above dyes is the efficacy of dyes, whose most marked photographic effect is desensitizing, e. g., the nitrothiacarbocyanine and the diazathiacarbocyanine. However, marked photographic desensitizing is not a necessity for optical sensitization of the insolubilization reaction of the present invention as shown by the efficiency of 3,3′-diethylthiacarbocyanine and of 3,3′-diethyl-9-methylthiacarbocyanine.

One advantage of the use of the above dyes, particularly the thiacarbocyanines, is that they are retained in the insolubilized relief after development, thus increasing the contrast and the visibility of the relief image which is important in photomechanical processes.

My invention will now be described by means of a specific example setting forth methods of making and utilizing an optically sensitized ketone composition.

*Example*

In 20 cc. of a 10% solution of a polyvinyl butyral resin in ethyleneglycolmonomethyl ether is dissolved 0.3 gram of difurfuralcyclopentanone. This is spread on a glass plate (100 cc. per sq. cm.) and air-dried to a hard film.

If such a film is exposed to an intense light, such as a mercury arc or a 500 watt tungsten light for some minutes through screens transmitting respectively (*a*) all wavelengths, (*b*) only blue and near ultraviolet radiation (No. 47 filter transmitting only short of about 510 mμ), (*c*) "minus blue" (No. 12, transmitting only longer than about 500 mμ throughout the visible spectrum), (*d*) "orange" (No. 21, transmitting only longer than about 550 mμ), (*e*) "red" (No. 25, transmitting only longer than about 590 mμ); only the parts exposed through the clear and blue strips will be changed. On immersion of the exposed plate in tertiary butanol, those parts exposed through the minus blue, orange and red strips dissolve away, leaving a relief image produced by the white and blue light.

If now the coating mixture contains in addition to the constituents mentioned, about 0.5 to 1.5 mgm./cc. of 3,3′-diethyl-6,6′-dinitrothiacarbocyaninechloride or paratoluene sulfonate, with an absorption maximum in the mixture at about 590 mμ, exposure to the light of a 500 watt tungsten lamp produces insolubilized material, with light transmitted by the clear, blue, minus blue, orange and red screens. The dye therefore has a photosensitizing effect on the insolubilization reactions.

In this example, the filter numbers correspond to filters of the same number, the characteristics of which are set forth in the publication "Wratten Light Filters" 1936, published by Eastman Kodak Company.

In the above example it will be noted that different solvents are used for coating the sensitive composition than for developing the plate, i. e., washing out the soluble regions of the exposed coating. This technique includes using for the developer a poorer solvent for the sensitive composition than was used in making the coating in order to obtain a clean differentiation between exposed and unexposed regions. It is advantageous to use a substantially water-impermeable organic colloid vehicle resistant to acid and alkali such as the vinylbutyral resin mentioned, and preferably a cellulose ethyl ether to maintain the constituents of the composition, i. e., the sensitizer and ketone compound in solid solution in the amorphous state and to insure that the developed image will serve as a resist on a printing plate particularly against the effects of acid and alkali etching solutions customarily used by the trade. Polymeric materials which are representative of those suitable for this purpose are tabulated together with suitable coating and developing solvents in the following table.

| Polymeric material | Coating solvent | Developer |
|---|---|---|
| Cellulose ethyl ether | Xylene-butanol (4/1). | Kerosene + palmitic acid. |
| Polymethyl methacrylate | Chlorobenzene | Xylene-toluene. |
| Polystyrene | do | Di-isobutyl ketone. |
| Polyterpene | Carbon-tet.-toluene | Kerosene. |
| Cumarone-indene | Chlorobenzene | t-Butanol. |
| Melamine-formaldehyde | Xylene-butanol | Kerosene. |
| Phenolformaldehyde | t-Butanol | Do. |
| Polyvinylchloride-vinyl acetate. | Chlorobenzene | Di-isobutyl ketone. |

It may be desirable to add other solvents to the coating mixture such as the lower alcohols to facilitate dispersion of the ketone and sensitizer in the vehicle.

Other natural and synthetic resins, e. g., copal and dammar resins, will be found to produce useful results when employed for the purpose mentioned. When applying the sensitive compositions to a support, the well-known metal printing plates as zinc, copper and aluminum, as well as cellulose ester and synthetic resin sheeting may be used.

It will be apparent that since desensitization is not a factor in my compositions, concentration of the dyes in the compositions is not a limitation of my invention except insofar as sufficient dye should be used to fully sensitize the ketone but not so much that exposure of the coating under the negative or to other subject will be unduly long. By proper selection of sensitizer or mixture of sensitizer, a considerable speed increase can be realized over the untreated mixture. Selective optical sensitization can produce useful results in color processes.

My invention having been described, I would have it understood that the disclosure herein is by way of example and that I consider as included in my invention all modifications and equivalents falling within the scope of the appended claims.

What I claim as my invention and desire to be secured by Letters Patent of the United States is:

1. A photomechanical resist composition comprising as the light-sensitive material a ketone selected from the group consisting of those ketones represented by the following general formulas:

$$R-CH=CH-\overset{O}{\overset{\|}{C}}-(CH=CH)_{n-1}-R_1$$

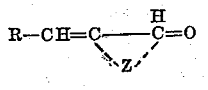

and

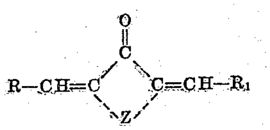

wherein R and $R_1$ represents a member selected from the group consisting of an aralkyl group, an aryl group and a furyl group, $n$ represents a positive integer of from 1 to 2 and Z represents the non-metallic atoms necessary to complete a carbocyclic ring, the composition containing as a spectral sensitizer for the composition a dye selected from the group consisting of thiacarbocyanine, dibenzothiacarbocyanine, thiazolocarbocyanine, selenacarbocyanine and azathiacarbocyanine dyes.

2. A photomechanical resist composition comprising as the light-sensitive material a ketone having the following general formula:

$$R-CH=CH-\overset{O}{\overset{\|}{C}}-(CH=CH)_{n-1}-R_1$$

wherein R and $R_1$ represents a member selected from the group consisting of an aralkyl group, an aryl group and a furyl group, $n$ represents a positive integer of from 1 to 2, the composition containing as a spectral sensitizer for the composition a dye selected from the group consisting of thiacarbocyanine, dibenzothiacarbocyanine, thiazolocarbocyanine, selenacarbocyanine and azathiacarbocyanine dyes.

3. A photomechanical resist composition comprising as the light sensitive material a ketone having the following general formula:

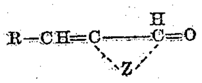

wherein R represents a member selected from the group consisting of an aralkyl group, an aryl group, and a furyl group, and Z represents the non-metallic atoms necessary to complete a carbocyclic ring, the composition containing as a spectral sensitizer for the composition a dye selected from the group consisting of thiacarbocyanine, dibenzothiacarbocyanine, thiazolocarbocyanine, selenacarbocyanine and azathiacarbocyanine dyes.

4. A photomechanical resist composition comprising as the light sensitive material a ketone having the following general formula

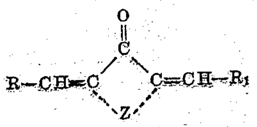

wherein R and $R_1$ represents a member selected from the group consisting of an aralkyl group, an aryl group, and a furyl group, and Z represents the non-metallic atoms necessary to complete a carbocyclic ring, the composition containing as a spectral sensitizer for the composition a dye selected from the group consisting of thiacarbocyanine, dibenzothiacarbocyanine, thiazolocarbocyanine, selenacarbocyanine and azathiacarbocyanine dyes.

5. A photomechanical resist composition comprising as the light sensitive material a ketone having the following general formula

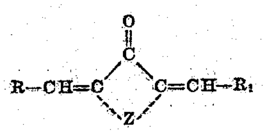

wherein R and $R_1$ represent a member selected from the group consisting of an aralkyl group, an aryl group, and a furyl group, and Z represents the non-metallic atoms necessary to complete a carbocyclic ring, the composition containing as a spectral sensitizer for the composition a thiacarbocyanine dye.

6. A photomechanical resist composition comprising as the light sensitive material a ketone having the following general formula

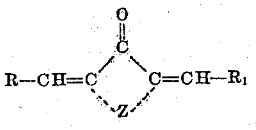

wherein R and $R_1$ represents a member selected from the group consisting of an aralkyl group, an aryl group, and a furyl group, and Z represents the non-metallic atoms necessary to complete a carbocyclic ring, the composition containing as a spectral sensitizer for the composition a dibenzothiacarbocyanine dye.

7. A photomechanical resist composition comprising as the light sensitive material a ketone having the following general formula

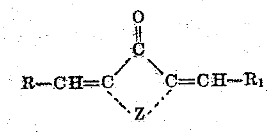

wherein R and $R_1$ represents a member selected from the group consisting of an aralkyl group, an aryl group, and a furyl group, and Z represents the non-metallic atoms necessary to complete a carbocyclic ring, the composition containing as a spectral sensitizer for the composition a thiazolocarbocyanine dye.

8. A photomechanical resist composition comprising as the light sensitive material a ketone having the following general formula

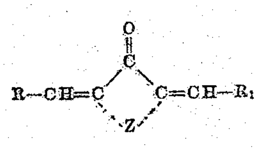

wherein R and $R_1$ represents a member selected from the group consisting of an aralkyl group, an aryl group, and a furyl group, and Z represents the non-metallic atoms necessary to complete a carbocyclic ring, the composition containing as a spectral sensitizer for the composition a selenacarbocyanine dye.

9. A photomechanical resist composition comprising as the light sensitive material a ketone having the following general formula

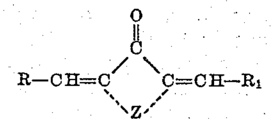

wherein R and $R_1$ represents a member selected from the group consisting of an aralkyl group, an aryl group, and a furyl group, and Z represents the non-metallic atoms necessary to complete a carbocyclic ring, the composition containing as a spectral sensitizer for the composition an azathiacarbocyanine dye.

10. A photomechanical resist composition comprising as the light sensitive material a ketone having the following general formula

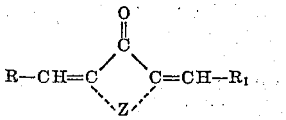

wherein R and $R_1$ represents a member selected from the group consisting of an aralkyl group, an aryl group, and a furyl group, and Z represents the non-metallic atoms necessary to complete a carbocyclic ring, the composition containing as a spectral sensitizer for the composition a salt of dialkylthiacarbocyanine dye the alkyl groups of which contain from 1 to 4 carbon atoms.

11. A photomechanical resist composition comprising as the light sensitive material a ketone having the following general formula

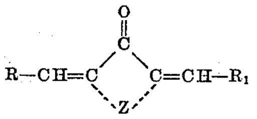

wherein R and $R_1$ represents a member selected from the group consisting of an aralkyl group, an aryl group, and a furyl group, and Z represents the non-metallic atoms necessary to complete a carbocyclic ring, the composition containing as a spectral sensitizer for the composition a salt of a dialkyl dibenzothiacarbocyanine dye the alkyl groups of which contain from 1 to 4 carbon atoms.

12. A photomechanical resist composition comprising as the light sensitive material a ketone having the following general formula

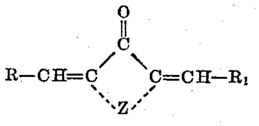

wherein R and $R_1$ represents a member selected from the group consisting of an aralkyl group, an aryl group, and a furyl group, and Z represents the non-metallic atoms necessary to complete a carbocyclic ring, the composition containing as a spectral sensitizer for the composition a salt of a dialkylthiazolocarbocyanine dye the alkyl groups of which contain from 1 to 4 carbon atoms.

13. A photomechanical resist composition comprising as the light sensitive material a ketone having the following general formula

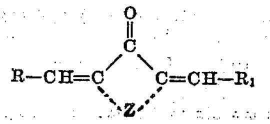

wherein R and $R_1$ represents a member selected from the group consisting of an aralkyl group, an aryl group, and a furyl group, and Z represents the non-metallic atoms necessary to complete a carbocyclic ring, the composition containing as a spectral sensitizer for the composition a salt of a dialkylselenacarbocyanine dye the alkyl groups of which contain from 1 to 4 carbon atoms.

14. A photomechanical resist composition comprising as the light sensitive material a ketone having the following general formula

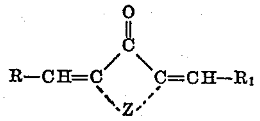

wherein R and $R_1$ represent a member selected from the group consisting of an aralkyl group, an aryl group, and a furyl group, and Z represents the non-metallic atoms necessary to complete a carbocyclic ring, the composition containing as a spectral sensitizer for the composition a salt of a dialkylazathiacarbocyanine dye the alkyl groups of which contain from 1 to 4 carbon atoms.

15. A photomechanical resist composition comprising difurfuralcyclopentanone as the light sensitive material, 3,3′-diethyl-6,6′-dinitrothiacarbocyanine chloride as a spectral sensitizer for the composition, and cellulose ethyl ether as a vehicle.

16. A photomechanical resist composition comprising difurfuralcyclopentanone as the light sensitive material, 3,3′-diethylthiacarbocyanine p-toluene sulfone as a spectral sensitizer for the composition, and cellulose ethyl ether as a vehicle.

17. A photomechanical resist composition comprising difurfuralcyclopentanone as the light sensitive material, 3,3′-diethyl-4,4′-diphenyl thiazolocarbocyanine iodide as a spectral sensitizer for the composition and cellulose ethyl ether as a vehicle.

18. A photomechanical resist composition comprising difurfuralcyclopentanone as the light sensitive material, 3,3′-diethyl-9-methylselenacarbocyanine bromide as a spectral sensitizer for the composition, and cellulose ethyl ether as a vehicle.

19. A photomechanical resist composition comprising difurfuralcyclopentanone as the light-sensitive material, 3,3′-diethyl-8,9-diazathiacarbocyanine iodide as a spectral sensitizer for the composition and cellulose ethyl ether as a vehicle.

20. The composition of claim 1 wherein the spectral sensitizer is a cyanine dye derived from a member of the group consisting of thiazoles, benzothiazoles, benzoselenazoles and naphthothiazoles.

WILLIAM WEST.

References Cited in the file of this patent

UNITED STATES PATENTS

| Number | Name | Date |
|---|---|---|
| 1,587,274 | Beebe et al. | June 1, 1926 |

FOREIGN PATENTS

| Number | Country | Date |
|---|---|---|
| 573,798 | Great Britain | Dec. 6, 1945 |